Figure 1:
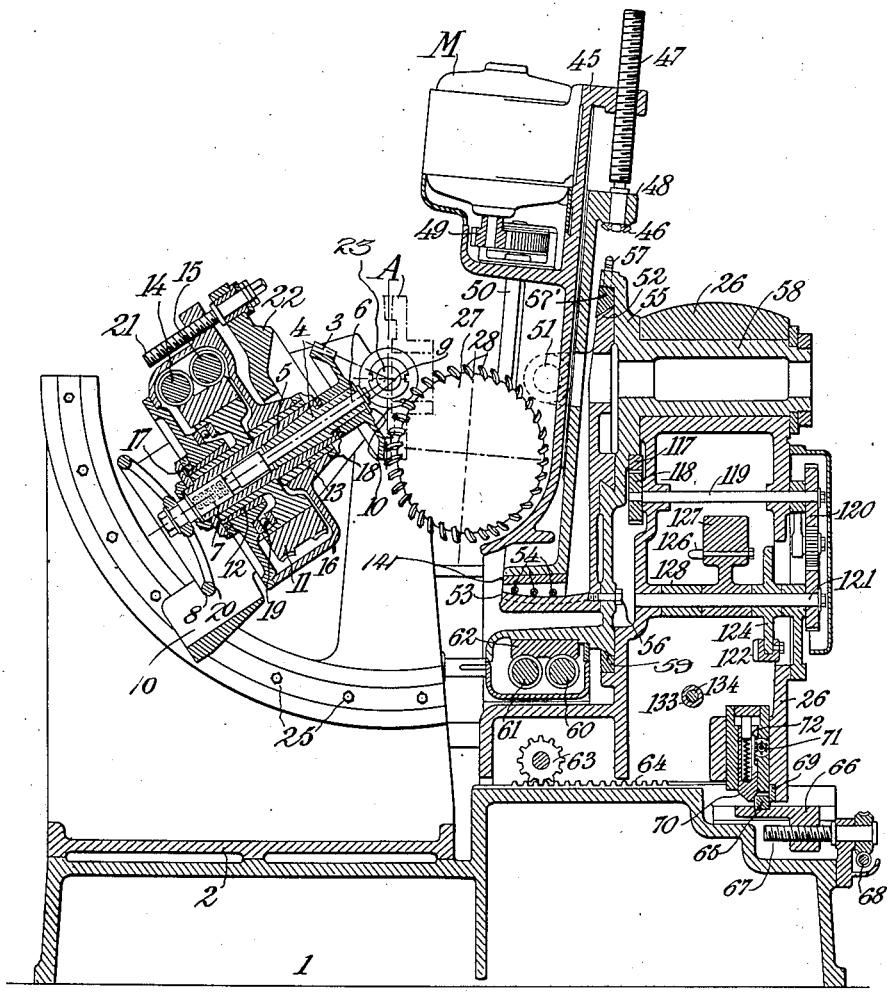

E. H. WINGQVIST.
MACHINE FOR CUTTING GEAR WHEELS.
APPLICATION FILED SEPT. 30, 1918.

1,370,573.

Patented Mar. 8, 1921.

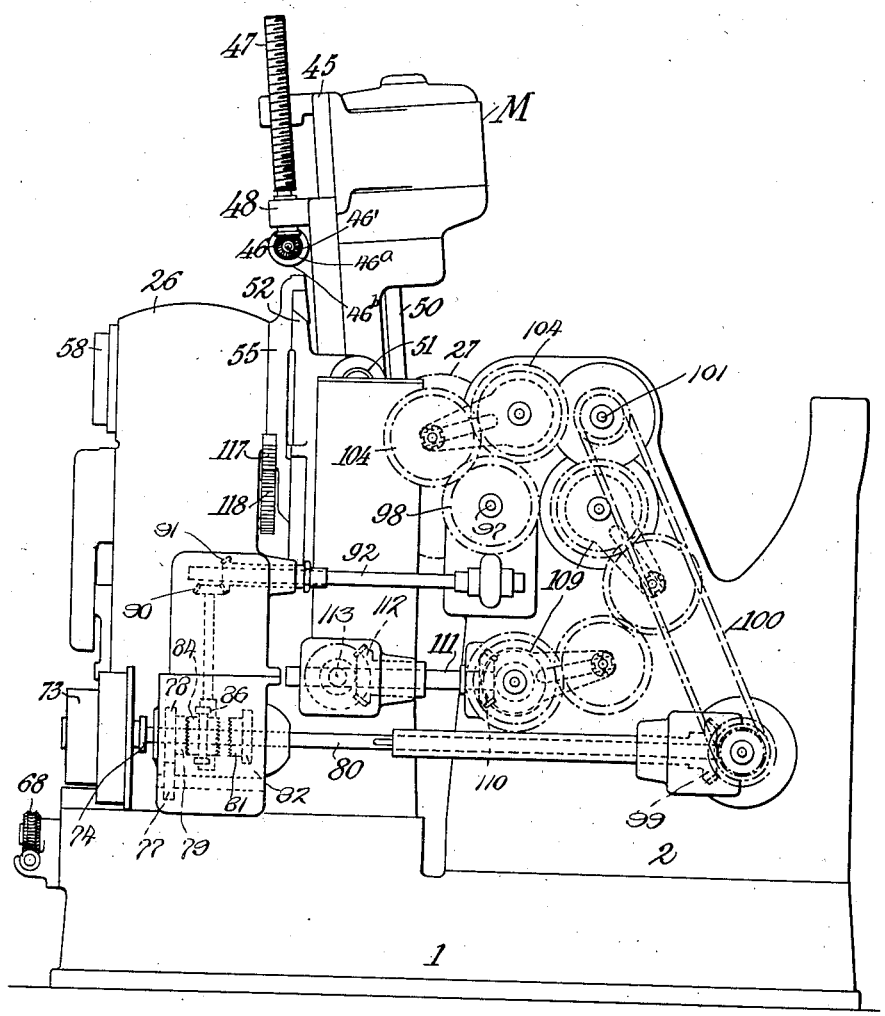

E. H. WINGQVIST.
MACHINE FOR CUTTING GEAR WHEELS.
APPLICATION FILED SEPT. 30, 1918.

1,370,573.

Patented Mar. 8, 1921.
5 SHEETS—SHEET 3.

WITNESS:
René Bruine

INVENTOR:
Erik Hjalmar Wingqvist
By Attorneys,

E. H. WINGQVIST.
MACHINE FOR CUTTING GEAR WHEELS.
APPLICATION FILED SEPT. 30, 1918.

1,370,573.

Patented Mar. 8, 1921.

WITNESS:

INVENTOR:
Erik Hjalmar Wingqvist
By Attorneys,

UNITED STATES PATENT OFFICE.

ERIK HJALMAR WINGQVIST, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

MACHINE FOR CUTTING GEAR-WHEELS.

1,370,573.   Specification of Letters Patent.   Patented Mar. 8, 1921.

Application filed September 30, 1918. Serial No. 256,181.

*To all whom it may concern:*

Be it known that I, ERIK HJALMAR WINGQVIST, a subject of the King of Sweden, residing at Utbynäs Villastad, Gottenborg, in the Kingdom of Sweden, have invented new and useful Improvements in Machines for Cutting Gear-Wheels, of which the following is a specification.

This invention relates to machines for manufacturing toothed wheels, in which the spaces between the teeth are cut according to the rolling principle by means of two rotating cutter disks placed at an angle to each other and having plane cutting surfaces, which cutters work simultaneously one and the same space between two teeth, the toothed wheel blank and the said cutter disks performing the same movement in relation to each other as a rotating toothed wheel and a tooth of a rack or of a so called generating wheel engaging said toothed wheel.

In manufacturing bevel gear wheels it is as well known necessary in order to obtain a theoretically correct tooth shape that the position of the wheel blank and that of cutter disks are such in relation to each other that the imagined line of intersection between the cutting planes of the cutter disks always runs through the apex of the pitch cone of the wheel blank (straight teeth) or touch a sphere having its center in said apex (skew teeth).

In manufacturing bevel gear wheels of different diameters and different apex angles it is necessary to provide the machine with devices rendering it possible to effect an accurate adjustment of the wheel blank and the cutter disks in the manner set forth above. The machines further should be provided with driving devices for putting the cutter disks in rotation around their axes and for effecting the necessary rolling movement of the wheel blank and the cutter disks in relation to each other, these movements having to be performed independently of the above-mentioned adjusting movements. Further it is necessary to use reversing and pitch devices for adjusting the wheel blank in cutting each new space between two teeth, said adjusting movement likewise having to be performed independently of the rolling movement.

On account of unsuitable choice of the means for effecting said movements and also on account of unsuitable arrangement of said means the machines for cutting toothed wheels heretofore constructed have been very complicated and on account thereof unreliable. Especially the adjustment of the wheel blank and the cutter disks has caused much trouble.

The object of the present invention is to provide a machine for cutting toothed wheels of a simple and reliable construction in which the adjustments may be accomplished easily and with the greatest accuracy.

The invention consists, chiefly, in that the wheel blank and the cutter disks are each supported by one part of the machine said parts performing each only a rotating movement around axes that intersect each other in the apex of the pitch cone of the wheel blank. Another essential feature of the invention consists in that the driving device for effecting the cutting movement of the cutter disks is supported direct by the same part of the machine as supports the cutter disks, whereby the means for transmitting movement between said parts is simplified. The invention further relates to arrangements and combinations of parts hereinafter described.

Figure 4:
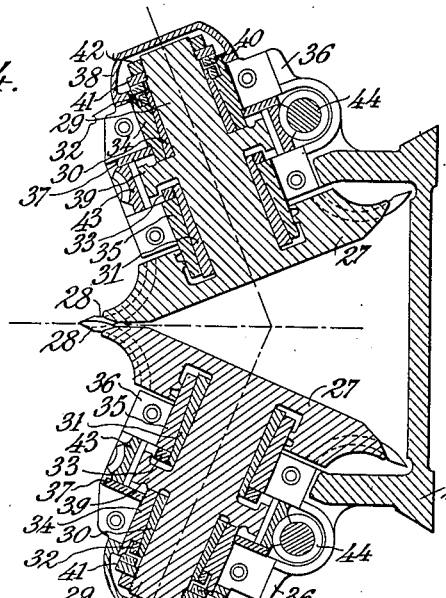
Figure 6:
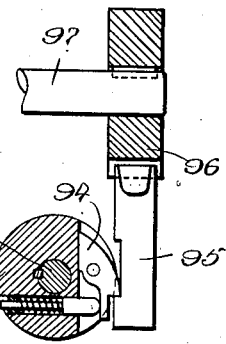
Figure 3:
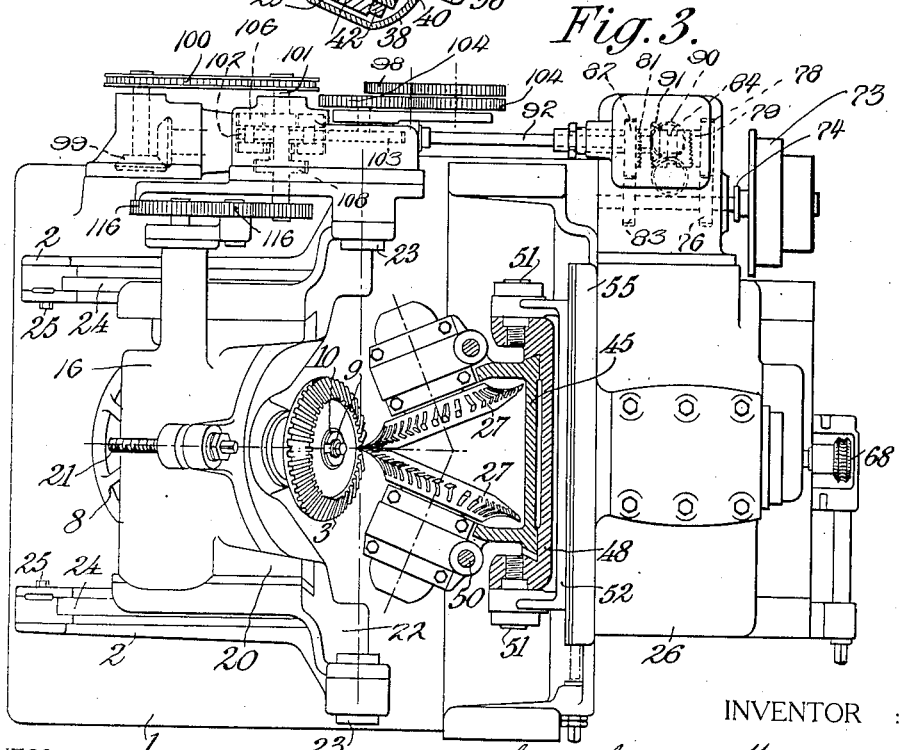
Figure 5:
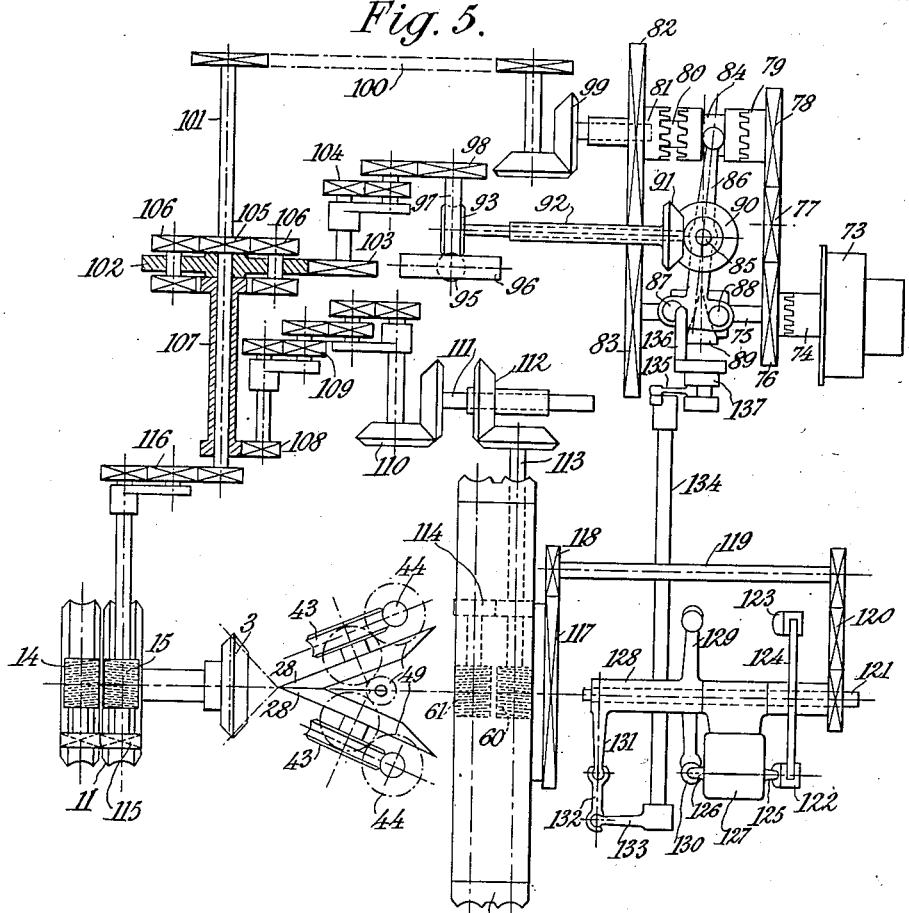
Figures 7, 8:
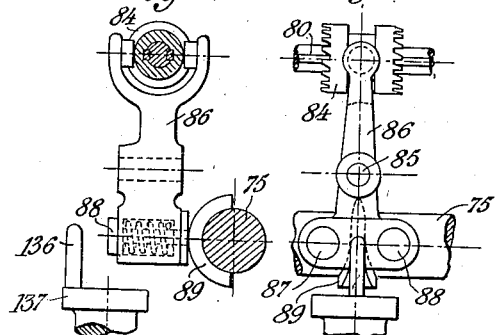
Figure 9:
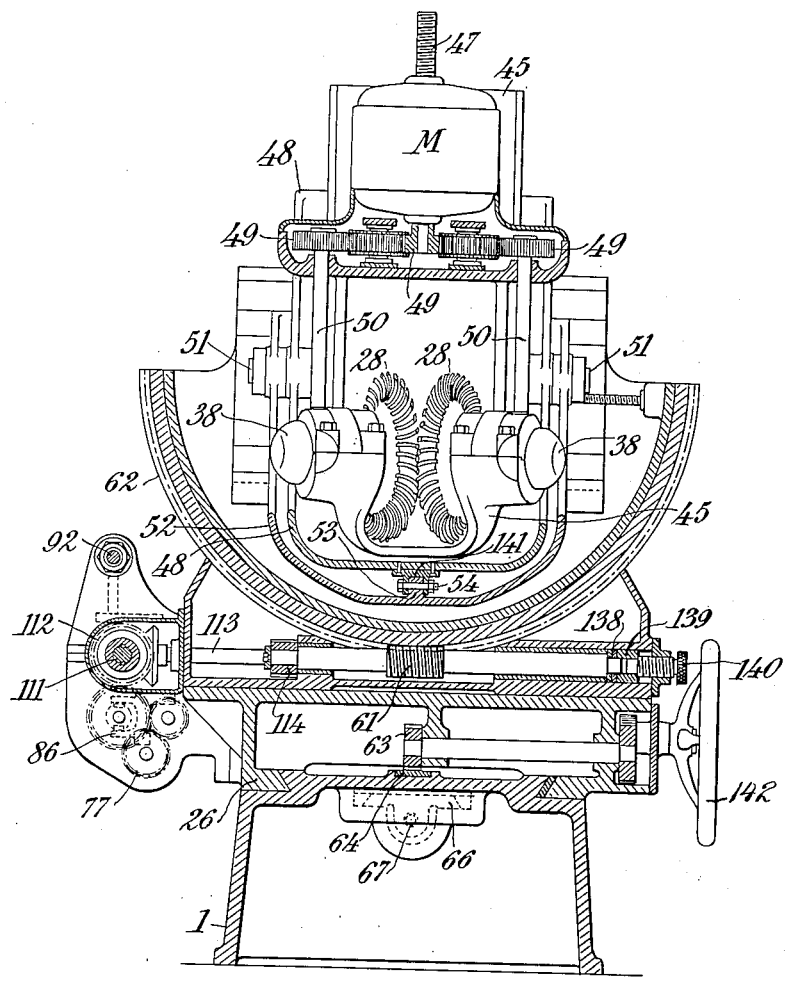

In the accompanying drawings is shown one embodiment of the invention. Figure 1 is a longitudinal section of a machine for cutting bevel gear wheels. Fig. 2 is a side elevation of the machine, seen from the opposite side. Fig. 3 is a plan view of the machine, partially in section. Fig. 4 shows on a larger scale and in section the bearing devices of the cutter disks. Fig. 5 illustrates diagrammatically the driving devices and gearings of the machine. Fig. 6 shows a detail view of an automobile locking and releasing device. Fig. 7 shows an end view of a coupling device, partially in section and Fig. 8 shows a plan view thereof. Fig. 9 is a front view, partly in section, of the machine.

To the base plate 1 (Figs. 1, 2 and 3) is secured a frame 2 supporting clamping, adjusting and driving devices for the wheel blank 3. This blank is placed on the outer, cylindrical end of a sleeve 4 the other conical end of which is guided in an outer sleeve 5. In the sleeves 4 and 5 is inserted a spindle 6 which is slidable but not rotatable in relation to the sleeves and the one end of which is screwed into a rotatable but not slidable nut 7 provided at its outer end with a hand wheel 8. The spindle is at its upper, free end formed with an annular recess in which, after the wheel blank has been placed on the sleeve 4, a washer 9 of usual construction is inserted. Said washer being prevented from being displaced axially in relation to the spindle 6 is in tightening the nut 7 by means of the hand wheel pressed against a second washer 10 bearing in its order against the wheel blank, whereby the latter is clamped against the end of the sleeve 5.

To the sleeve 5 is by means of key and key way or in any other suitable manner secured a worm wheel 11 serving to rotate the sleeve 3 and the wheel blank clamped thereon. The extended nave of the worm wheel and the end of the sleeve 5 nearest to the wheel blank are journaled in sleeves 12 and 13 in a casing 16 surrounding the worm wheel 11 and the worms 14, 15 driving the same. The bearing sleeves 12 and 13 are externally conical and slotted longitudinally and at their ends provided with nuts 17 and 18 by means of which they may be set when play occurs. In order to prevent axial displacement of the sleeve 5 and the worm wheel the latter is further journaled on a thrust ball bearing 19.

All the above described clamping and driving devices for the wheel blank 3 are disposed on a slide 20 (Fig. 3) which by means of a set screw 21 can be displaced in guides of a frame 22 in direction parallel with the axis of the wheel blank or the spindle 6. The said frame 22 can be swung on pins 23 of the frame 2 by means of any suitable devices and is during the swinging movement guided in curved grooves 24 of the frame 2. After adjustment it is locked by means of screws 25.

By displacing the slide 20 and swinging the frame 22 the wheel blank can be placed in such a position that the apex of the pitch cone of the wheel blank will coincide with the axis of rotation of the frame 22 and the pitch cone will touch a vertical plane through said axis, as is shown in Fig. 1.

On the base plate 1 is further provided a frame 26 supporting the cutter disks and also adjusting and driving devices for the latter. The cutter disks consists of disk-shaped bodies 27 and of a number of substantially radial cutters or teeth 28 secured thereto, the cutting edges of which lie in planes forming with each other an angle corresponding to the angle of inclination between the plane surfaces of a tooth of an imagined generating wheel A (Fig. 1). The said cutters or teeth are so disposed that the teeth of the one cutter enter into the spaces between the teeth of other cutter. The teeth simultaneously working the wheel blank, represent a tooth of the imagined generating wheel.

The shafts 29 of the cutter disks, which may be integral with the respective disks 27, as is shown in the drawing, are in the same manner as the shaft of the wheel blank journaled in sleeves 30 and 31 being externally of conical shape and slotted longitudinally and provided with nuts 32 and 33 for setting the sleeves when play occurs. The sleeves 30 and 31 are inserted in sleeves 34 and 35 respectively in the divided bearing box 36, the sleeve 34 in such manner that it can be displaced axially and be locked in desired position by means of nuts 37 and 38 of which the latter one is formed as a cap for tightening at the end of the shaft. The sleeve 34 also constitutes a thrust bearing for the shaft 29, an annular flange 39 of the shaft bearing against the inner end of said sleeve, while a washer 40 bears against the outer end thereof, said washer being pressed into an annular recess in the end of the sleeve and kept in position by means of nuts 41 and 42 screwed on the end of the shaft, the latter one of said nuts serving as locking nut. On the outer circumference of the flange 39 is slidably but not rotatably provided the tooth ring 43 of a worm wheel in which engages a driving worm 44.

By loosening the nuts 38 and rotating the nuts 37 in the one direction or the other the sleeves 34 and thereby the cutter disks are displaced from or toward each other, whereby the width of the bottom of the space between two teeth generated can be decreased or increased.

The bearing boxes 36 of the cutter disks are supported by a slide 45 disposed in guides of a swingable frame 48 so that it can be displaced in said frame in a direction at right angles to the plane through the axes of the cutter disks. The displacement of the slide 45 in the frame 48 is accomplished by means of a screw 47 which can be rotated by means of a bevel gear 46, meshing with a similar gear 46' fast on a rotatable shaft 46$^a$ which is provided with a hand wheel 46$^b$ (see Fig. 2). The slide 45 also supports the driving device for the cutter disks (suitably an electric motor M). The latter is by means of a gear 49 connected with shafts 50 of the worms 44 engaging the worm wheels 43 of the cutter disks (Fig. 4).

The frame 48 is journaled on pins 51 of a slide 52 and is at its lower end guided by a projection or rib 53 on the slide 52. After it is adjusted into desired position it is locked in said position by means of screws 54 which in the construction form shown are inserted through projections or flanges of a member 141 secured to the frame 48, said flanges clamping between themselves the projection or rib 53 extending from the slide 52. The slide 52 in its turn is supported by a swingable frame 55 wherein it can be displaced in a direction at right angles to the direction of movement of the slide 45 and be locked in desired position by means of screws 56 and 57. The screws 56 pass through horizontal slots in the frame 55, shown in section in Fig. 1. The screws 57 have threads engaging threaded holes in the upper edge of the frame 55 and act when tightened to force a guide strip 57' into clamping engagement with the dovetailed edge of the slide 52. In the construction form shown the frame 55 is provided with a hollow pin or shaft 58, journaled in the upper part of the frame 26, and is guided by a conical guiding path 59 provided at the lower part of the frame 26. The shaft 58, which constitutes the axis of rotation of the imagined generating wheel A, is put in rotation in the one direction or the other by means of driving worms 60 and 61 engaging a worm wheel ring 62 provided on the lower, cylindrical portion of the frame 55.

The frame 26 is movable on the base plate 1 which for this purpose is formed with suitable guide grooves. The displacement of the frame 26 on the base plate to and from the wheel blank to be worked is effected by means of a pinion 63, journaled in the frame 26 and rotated by means of a hand wheel 142, Fig. 9. The said pinion engages a rack 64 of the base plate 1. The frame 26 can be locked in desired position by means of an adjustable locking device consisting of an adjustable slide 66, disposed on the base plate 1, and of a spring actuated locking pin or piston 70 coöperating with said slide 66. The latter, which supports an abutment 65, may be adjusted by means of a screw 67 and a worm gear 68. With the adjustable abutment 65 coöperate on the one hand a fixed shoulder 69 provided on the frame 26 and on the other hand the said spring actuated pin or piston 70 which latter can be disengaged from the abutment 65 by means of a pinion 71 coöperating with teeth 72 formed in the piston 70. The latter has at the bottom an inclined surface so that, when it is at the outer side of the abutment 65, it will when the frame 26 is moved toward the wheel blank be lifted automatically by the abutment 65 against the action of the spring of the piston. When the frame 26 has reached the desired position which is determined by the position of the abutment 65, further displacement of the frame toward the wheel blank will be prevented by the fixed shoulder 69 and at the same time the spring actuated piston 70 is pushed down into engagement with the opposite side of the abutment 65 whereby the frame 26 will be locked.

By the devices described above the following adjustments of the cutter disks may be accomplished.

By displacing the slide 45 upward or downward by means of the screw 47 the radius of swinging of the cutter disks, i. e., the radius of the generating wheel A is respectively decreased or increased and at the same time the pitch of the generating wheel and thus also the pitch of the wheel generated is respectively decreased or increased. The number of teeth to be generated will not be changed by said adjustment.

If the number of teeth is to be varied, for instance increased while maintaining the pitch unchanged, the frame 26 is displaced (toward the wheel blank) at the same time that the slide 45 is displaced downward and the frame 48 is swung on the pins 51 outward from the wheel blank. The last mentioned swinging movement should be such that the cutter disks remain in such a position relatively to the wheel blank that the imagined line of intersection between their plane cutting surfaces runs through the apex of the pitch cone of the wheel blank, i. e., the cutter disks should take up such a position that their cutting surfaces coincide with the two side surfaces of a tooth of the generating wheel, this being a necessary condition for the tooth shape generated being theoretically correct.

A decrease of the number of teeth at an unchanged pitch is obtained by the frame 26 being displaced (from the wheel blank) at the same time that the slide 45 is displaced upward and the frame 48 is swung inward (in the direction toward the wheel blank).

A variation of the number of teeth as well as of the pitch at unchanged size of the generated wheel is effected by displacing the frame 26 to or from the wheel blank at the same time as the frame is swung respectively from or to the wheel blank.

An increase or decrease of the width of the bottom surface of the space between two adjacent teeth of the wheel generated is effected, as already mentioned, by displacing the cutter disks respectively from or to each other by means of the adjustable sleeves 34 (Fig. 4).

In cutting bevel gear wheels with different apex angles it should be observed that the apex of the wheel blank always coincides with the axis of swinging of the frame 22 and that the pitch cone always touches the pitch plane of the generating wheel A which is in this case assumed to be vertical. By swinging the frame 22 in the one direction or the other it is thus possible to generate within certain limits bevel gear wheels of the same pitch but with different number of teeth and different apex angles.

In cutting bevel gear wheels having skew teeth the slide 52 is displaced toward the one side or the other whereby the cutters of the cutter disks representing the tooth of the generating wheel are moved in parallel direction to a larger or smaller distance to either side of the center of the generating wheel. In other respects the adjusting movements for the wheel blank are the same as those described above.

In the machine described it is thus possible by simple displacements or swingings of the parts supporting the wheel blank and cutter disks respectively to cut straight or skew toothed bevel gear wheels of various sizes and practically arbitrary number of teeth, arbitrary pitch and arbitrary apex angles.

When the wheel blank and the cutter disks have been adjusted in the manner described above and the cutter disks have been put in rotation by means of the motor M, the rolling movement of the wheel blank and the cutter disks relatively to each other is effected by the sleeves 4 and 5 supporting the wheel blank and the frame 55 supporting the cutter disks being each put into a reciprocating swinging movement around axes that, as is shown in Fig. 1, intersect each other in the apex of the pitch cone of the wheel blank.

The devices for effecting said swinging movements and the devices for effecting the pitch movement of the wheel blank for cutting a new space between two teeth are shown diagrammatically in Figs. 5, 6, 7 and 8.

In the construction form shown the driving power is taken from the pulley 73 which by means of a clutch 74 or the like is coupled with a gear wheel 76 rigidly secured to the shaft 75 and engaging by means of an intermediate gear wheel 77 a gear wheel 78. The latter one, which is provided with a clutch member 79, is rotatably mounted on a shaft 80 on the other end of which is rotatably mounted a gear wheel 82, likewise provided with a clutch member 81, said gear wheel 82 engaging a gear wheel 83 rigidly secured to the shaft 75. With the clutch members 79 and 81 coöperates a clutch member 84 slidably but not rotatably mounted on the shaft 80 and operated by means of the forked end of an arm 86 swingably journaled on a shaft 85. This arm is at its other end provided with two movable spring actuated pins 87 and 88 (Figs. 5, 7 and 8), coöperating with a wedge shaped cam 89 provided on the shaft 75 in such manner that when the pins are pressed down toward the shaft 75 into engagement with the cam, the arm 86 is swung and the clutch member 84 is brought into engagement with the one or the other of the clutch members 79 and 81, whereby the shaft is put in rotation in the one direction or the other.

To the shaft 85 is further secured a bevel gear wheel 90 engaging a bevel gear wheel 91, secured to the one end of a shaft 92, to the other end of which is keyed a disk 93 to which is pivotally secured a spring actuated pawl 94 (Figs. 5 and 6). With this pawl coöperates a locking pin 95, normally engaging a cam disk 96 secured to the one end of a shaft 97, to the other end of which is secured a gear wheel 98. This gear wheel is thus locked as long as the locking pin 95 engages the cam disk 96.

In the position of the clutch member 84 shown in Fig. 5 the shaft 80 rotates in the same direction as the pulley 73 and this movement is transmitted through a bevel gear 99 and a chain wheel gear 100 to a shaft 101. On this shaft 101 is provided a planet gear the intermediate wheel 102 of which is in engagement with a gear wheel 103 which by means of a gear 104 is connected with the gear wheel 98. The possibility of the intermediate wheel 102 to rotate is thus dependent on whether the gear wheel 98 is free to rotate or is locked by the pin 95. When the said intermediate wheel 102 is locked, the movement of the shaft 101 is transmitted through the gear wheels 105 and 106 to a toothed sleeve 107 rotatably mounted on the shaft 101 and from this sleeve by means of a gear wheel 108 and a gear train 109 to a bevel gear pair 110. The one wheel of this bevel gear pair is by means of a shaft 111 connected with a bevel gear pair 112 which by a shaft 113 is connected with the one driving worm 60 for the worm wheel ring 62 of the frame 55. The other driving worm 61 is driven from the shaft 113 by means of a gear 114. When the driving worms rotate, the frame 55 with the cutter disks is swung on the shaft 58 (Fig. 1). At the same time the wheel blank 3 is turned on its shafts, the two driving worms 14 and 15 of the worm wheel 11, which are connected to each other by a gear pair 115, being rotated by the shaft 101 through a gear train 116.

During the movements now described the two cutter disks cut out in well known manner a space between two teeth of the wheel blank. With no relative movement lengthwise of the teeth of the blank, this space will have a curved profile of the same radius as the cutters. If curved faces are not desired, the cutter carrier may be moved up and down by means of the screw 47.

During the swinging movement of the frame 55 a shaft 119 is put in rotation by means of a toothed ring 117 provided on the frame and a gear wheel 118 engaging said toothed ring 117, said shaft 119 being connected by means of a gear train 120 to a shaft 121. To this shaft 121 is rigidly secured a disk 124 having two abutments 122 and 123 and on the same shaft 121 are loosely mounted on the one hand a weight 127 having projections 125 and 126 and on the other hand a sleeve 128 which at the end facing the weight is provided with two radial arms 129 and 130. At the outer end of the sleeve 128 is an arm 131 which by means of a link 132 is pivotally connected with an arm 133 secured to the one end of a shaft 134. At the other end of the shaft 134 is eccentrically provided a link 135 which in the rocking of the shaft 134 in the one direction or the other actuates a rocking disk 137 having a pin 136 in such manner that the pin 136 is brought into engagement with the one or the other of the spring actuated pistons 87 and 88 of the arm 86 so that reversal takes place. The turning of the shaft 134 in the one direction or the other is effected by reason of the weight 127, by means of the abutments 122 and 123 being swung to the one side or the other somewhat beyond its upper position of equilibrium and thereupon by gravity it falls down and actuates by the projection 126 the one or the other of the arms 129 and 130, whereby the sleeve 128 and therewith the shaft 134 are put in a rapid rocking movement.

When the wheel blank and the cutter disks have rotated so far that a space between two teeth is fully cut out, the weight 127 effects the above described adjustment of the clutch member 84 so that the rotating movement of the pulley 74 will be transmitted through the shaft 75 and the gear wheels 83 and 82 to the shaft 80, the direction of movement of which will thereby be reversed. The wheel blank and the cutter disks are thus returned to their initial positions. As no indexing movement of the wheel blank has as yet taken place, the cutter disks will once more work the same space between two teeth, whereby the deviations from the correct tooth shape caused by eventual play in bearing and gearing parts of the machine will as far as possible be obviated. Simultaneously with the adjustment of the clutch member 84 a small rocking movement has been imparted to the shaft 92 by means of the bevel gear 90, 91, so that the pawl 94 is caused to engage the locking pin 95, as is shown in Fig. 6.

When the wheel blank and the cutter disks have reached their initial positions, a new adjustment of the clutch member 84 will take place in the manner described. At the same time a small rocking movement in the direction opposite to that mentioned above is imparted to the shaft 92, whereby the locking pin is lifted for a moment out of engagement with the cam disk 96. On account thereof the gear wheel is released, and as the friction in bearings and gearing parts between said wheel and the intermediate wheel 102 of the planet gear is considerably smaller than the friction in the members transmitting movement between the last-mentioned wheel and the worm wheel ring 62, the intermediate wheel 102 is put in rotation, whereby the rotating movement of the sleeve 107 and thus the swinging movement of the frame 55 supporting the cutter disks will cease. The wheel blank will however, continue to rotate. When it has rotated through an angle corresponding to the pitch, the cam disk 96 has accomplished a whole revolution, and the locking pin 95 again enters into engagement therewith, whereby the gear wheel 98 and thus the intermediate wheel 102 of the planet gearing are stopped. Thus the cutter disks again are swung on the shaft 58 and the next space between two teeth of the wheel blank is cut, whereupon the operations described above will be repeated until all spaces between the teeth have been cut.

In order to obviate as far as possible play especially at the worm wheel 11 and the worm wheel ring 62, these parts are, as is shown, each provided with two driving worms 14, 15 and 60, 61 respectively (Fig. 1) of which, one of each pair is adjustable axially in longitudinal direction, as shown with reference to the worms 60, 61 in Fig. 9. By this means it is possible to set the driving worms against their teeth rings when play occurs.

The adjustment of the worm 61 is effected by means of a screw 140 (Fig. 9) inserted in the frame 26 and bearing against a movable bushing 139 which bears against two washers 138 surrounding an extension of screw 61. Consequently, by tightening the screw 140 the threads of worm 61 will be caused to press against the worm wheel ring 62 which, on account thereof, will press against the threads of worm 60, Figs. 1 and 5, thus preventing any lost motion. The adjustment of the screws 14 and 15, Figs. 1 and 5, is effected by a similar mechanism.

In order to render it possible to displace the frame 26, the shafts 80, 92 and 111 (Fig. 5) are, as is shown, of telescopical construction.

Having now described my invention what I claim is:

1. A machine for cutting bevel gear wheels according to the rolling principle, comprising two rotatable cutter disks, a supporting member adapted to carry a wheel blank, and a supporting member adapted to carry said cutter disks, said cutter disks being mounted at an angle to each other and having cutting surfaces adapted to simultaneously work a space between two teeth of the wheel blank, and said supporting members each adapted to perform a rotating movement around its respective one of two axes which intersect each other in the apex of the pitch cone of the wheel blank.

2. A machine according to claim 1, comprising a driving means and means for adjusting said driving means at right angles to the plane of the axes of rotation of said cutter disks to vary the radius of the swinging of the cutter disks and the radius of an imagined generating wheel, said driving means being mounted on said cutter disk supporting member.

3. A machine according to claim 1, comprising means carrying said supporting member for said cutter disks and on which said member is movable in direction parallel with the inter-tooth space to be worked, said carrying means being pivoted on an axis parallel with the axis on which the blank supporting member is movable to vary the angle of the pitch cone of the blank to be cut.

4. A machine according to claim 1, comprising means for cutting skew toothed gear wheels, said means being adapted to permit movement of said supporting member of said cutting disks in a direction parallel to the plane through the axes of the cutter disks.

5. A machine according to claim 1, comprising means for moving the supporting member of the wheel blank in a direction parallel to the axis of rotation of the wheel blank and a swinging support for said supporting member movable around an axis at right angles to the axis of rotation and running through the apex of the pitch cone of the gear to be cut.

6. A machine for cutting bevel gear wheels, comprising two rotatable cutter disks mounted at an angle to each other and adapted to simultaneously work a space between two teeth of the wheel blank, bearing supports for the shafts of said cutter disks, a slide carrying said supports and movable to carry the cutter disks longitudinally of the teeth to be cut, driving means mounted on said slide and having gearing engagement with the cutter disks, a frame carrying said slide, an oscillating support carrying said frame movable about an axis intersecting the pitch cone apex of the gear to be cut, a support for the blank oscillatable on the axis of such gear, and reversible driving means engaging said oscillating support and said blank support, adapted to impart to them in unison a rolling movement during the cutting action of the cutter disks.

7. A machine according to claim 6, comprising a swinging frame for carrying the support for the blank swingable around a trunnion axis intersecting the pitch cone apex perpendicularly to the axis of the gear to be cut, and means for adjusting said swinging frame around such trunnion axis to vary the conicity of the gear to be cut, and for fastening the same in place.

8. A machine according to claim 6, comprising means for adjusting the support for the blank in direction longitudinally of the axis of rotation of the gear to be cut.

9. A machine for cutting bevel gear wheels, comprising two rotatable cutter disks mounted at an angle to each other and adapted to simultaneously work a space between two teeth of the wheel blank, bearing supports for the shafts of said cutter disks, a slide carrying said supports and movable to carry the cutter disks longitudinally of the teeth to be cut, driving means for said cutter disks, a frame carrying said slide pivoted on an axis parallel to the axes of the cutter disks, whereby to vary the cut for gears of different conicity, and an oscillatable support for said frame.

10. A machine according to claim 9, having a transversely adjustable slide between said oscillatable support and said adjustable frame, whereby to displace the cutters to cut either direct or skew teeth gears.

11. A machine for cutting bevel gear wheels, comprising two rotatable cutter disks mounted at an angle to each other and adapted to simultaneously work a space between two teeth of the wheel blank, bearing supports for the shafts of said cutter disks, a slide carrying said supports and movable to carry the cutter disks longitudinally of the teeth to be cut, driving means for said cutter disks, a frame carrying said slide, an oscillating support carrying said frame movable about an axis intersecting the pitch cone apex of the gear to be cut, a support for the blank oscillatable on the axis of such gear, and reversible driving means engaging said oscillating support and said blank support, adapted to impart to them in unison a rolling movement during the cutting action of the cutter disks, said reversible driving means comprising reversible worm shafts having worms engaging worm gear teeth on said oscillatable parts respectively.

12. A machine according to claim 11, the oscillatable driving means comprising pairs of worm shafts, the shafts of each pair turning in opposite directions and having right and left worms, the respective pairs of worms engaging pairs of worm gear teeth on the said oscillating parts respectively.

13. A machine according to claim 11, the oscillatable driving means comprising pairs of worm shafts, the shafts of each pair turning in opposite directions and having right and left worms, the respective pairs of worms engaging pairs of worm gear teeth on the said oscillating parts respectively, with means for longitudinally adjusting the respective pairs of worm shafts to take up slack in the worm gearing.

In testimony whereof I have signed my name.

ERIK HJALMAR WINGQVIST.